United States Patent [19]
King

[11] Patent Number: 4,963,731
[45] Date of Patent: Oct. 16, 1990

[54] OPTICAL LEVEL MEASUREMENT SYSTEM
[75] Inventor: Charles King, Elmira, N.Y.
[73] Assignee: Courser, Incorporated, Elmira, N.Y.
[21] Appl. No.: 392,646
[22] Filed: Aug. 11, 1989
[51] Int. Cl.⁵ ............................................. G01N 21/86
[52] U.S. Cl. ................................. 250/560; 250/577; 356/375
[58] Field of Search .................. 250/237 G, 560, 561, 250/577; 73/290 R, 291, 293; 356/376, 381, 372, 445, 375

[56] References Cited
U.S. PATENT DOCUMENTS

| | | | |
|---|---|---|---|
| 1,706,857 | 3/1929 | Mathe | 73/290 R |
| 3,625,618 | 12/1971 | Bickel | 356/162 |
| 3,667,849 | 6/1972 | Nater et al. | 356/375 |
| 3,741,656 | 6/1973 | Shapiro | 250/577 |
| 3,744,915 | 7/1973 | Sick | 250/571 |
| 3,821,558 | 6/1974 | Mansfield | 250/577 |
| 3,905,705 | 9/1975 | Petrohilos | 356/160 |
| 3,994,586 | 11/1976 | Sharkins et al. | 356/445 |
| 4,053,227 | 10/1977 | Bodlaj | 356/4 |
| 4,201,476 | 5/1980 | Musto et al. | 356/386 |
| 4,245,517 | 1/1981 | Barker | 73/760 |
| 4,300,836 | 11/1981 | Holmes | 356/376 |
| 4,425,760 | 1/1984 | Furuta | 60/547.1 |
| 4,461,576 | 7/1984 | King | 250/560 |
| 4,508,970 | 4/1985 | Ackerman | 73/293 |
| 4,524,282 | 6/1985 | King | 250/577 |
| 4,585,343 | 4/1986 | Schave et al. | 356/445 |
| 4,774,403 | 9/1988 | Arts | 250/561 |
| 4,864,123 | 9/1989 | Mizutani et al. | 250/561 |

Primary Examiner—David C. Nelms
Assistant Examiner—Stephone B. Allen
Attorney, Agent, or Firm—Jones, Tullar & Cooper

[57] ABSTRACT

To provide rapid level measurements with improved reliability, the present invention provides an apparatus and method for optically determining the level of a material through a technique for measuring the ratio of digital signals acumulated during an index interval and for modifying those signals to compensate for variations that can be caused by the shape of the beam detector signal. More particularly, the present invention provides a level detector system which includes a laser beam source which directs light to be reflected from a surface to be measured, the reflected light being directed to a stationary parabolic mirror.

8 Claims, 5 Drawing Sheets

OPTICAL LEVEL MEASUREMENT SYSTEM

BACKGROUND OF THE INVENTION

The present invention relates to optical measuring devices, and more specifically to an optical gauge for measuring the level of a material with great accuracy.

Optical gauges are employed in many applications where mechnical contact is undesirable or impossible. For example, in processing molten glass or in the continuous casting of metals, it is necessary to maintain the surface of the material between desired limits as the process is carried out. Optical gauges, wherein only a light beam contacts the process material, are the natural choice for such applications. Lasers provide a desirable light source for optical gauges of this type since they emit a concentrated beam of coherent radiation at a wave length selected for best performance in the particular environment in which the gauge is to be employed.

In the measurement of the level of materials such as molten glass, it is necessary to maintain a high degree of accuracy in an atmosphere of combustion gases, smoke, water vapor, dust and the like. The use of a laser is advantageous in such a situation, allowing measurements at distances of many feet. The use of a laser system in such measurements is described in U.S. Pat. No. 4,461,676 to Charles King which issued on July 24, 1984, the disclosure of which is hereby incorporated herein by reference. The optical system described in that patent includes a laser light source, a stationary parabolic mirror, a rotating plane mirror, a photodetector and an electronics package for establishing a time period in response to actuation of the photodetector and for converting the time period to the desired measurement. Between the laser and the photodetector, the beam may strike the parabolic and the plane mirrors and the object or material being measured in any desired order, but in any event the axis of rotation of the plane mirror intersects the optical axis of the parabolic mirror at the latter's focal point.

The rotating mirror is carried on the output shaft of a synchronous motor which also carries an opaque disc having a slot or cutout area therein. A light source and a photodetector are fixedly positioned on opposite sides of the disc so that the cutout portion of the disc passes therebetween during a fixed portion of each revolution of the motor. When the device is used to measure the surface level of a material such as molten glass, the laser source is positioned to project a beam at an angle upon the surface of the glass for reflection to the parabolic mirror. As the surface level varies, the reflected beam will strike the parabolic mirror at different points along a radial path. The beam is reflected from the parabolic mirror to a point on the rotational axis of the rotating plane mirror, and is again reflected by the plane mirror along a moving path which intersects a second photodetector during a portion of its travel. As the position of the beam on the parabolic mirror varies with variations in the surface level of the glass, the angular position of the plane mirror at the time the beam intersects the second photodetector will vary. Thus, the time between activation of the first detector, which serves as an index detector, and the activation of the second photodetector varies, providing a direct indication of the distance between the actual surface level and a previously assigned reference surface level. In this configuration, the laser is mounted on one side of the material being measured and the optics and detector unit are in a separate housing on the other side.

As described in the aforesaid U.S. Pat. No. 4,461,576, the measurement of surface level is obtained as follows. The first, or index detector produces an output signal which is amplified and squared to produce a timed index signal during a short portion of each revolution to define an index period. The leading edge of the index signal is used to activate a reference signal in the form of a ramp voltage which increases at a constant rate within each index period. A measurement signal is also generated by the second detector in response to reception of the beam from the laser source after it has been reflected from the surface of the material to be measured. The beam signal occurs once in each rotation of the rotating mirror when the mirror is positioned so that the beam is reflected from the surface and from the parabolic mirror onto the second photodetector. This occurs during the index period at a time which depends upon the level of the material. In accordance with the '576 patent, the ramp reference signal is integrated from its beginning to the end of each cycle and is sampled by the occurrence of the beam signal. This sampled signal provides a value which can be used to determined the level of the material.

It has been found, however, that the analog ramp technique described in the '576 patent has certain inaccuracies, since the signal produced by the second, or beam detector is generally triangular, and can vary in amplitude due to changes in beam intensity or atmospheric conditions in the region of the material being detected.

SUMMARY OF THE INVENTION

In order to avoid the inaccuracies that can occur in the above-described system, and to provide rapid level measurements with improved reliability, the present invention provides an apparatus and method for optically determining the level of a material through a technique for measuring the ratio of digital signals accumulated during an index interval and for modifying those signals to compensate for variations that can be caused by the shape of the beam detector signal. More particularly, the present invention provides a level detector system which includes a laser beam source which directs light to be reflected from a surface to be measured, the reflected light being directed to a stationary parabolic mirror. The system includes a rotating plane mirror at the focal point of the parabolic mirror, the rotating mirror directing the beam to a beam detector in the manner disclosed in the aforesaid '576 patent. An index signal is also provided during a portion of the cycle of rotation of the plane mirror, also as described in the '576 patent. The index signal is amplified and squared, and in accordance with the present invention, its leading and trailing edges turn on and turn off, respectively, an index counter driven by a clock at a predetermined rate. Counts are accumulated during the index period at the clock rate to produce an index count which represents the length of the index signal. In similar manner, the output from the beam detector is amplified and squared, and the amplified signal is used to control a beam counter. The beam counter is controlled by both the index and the beam signals and may either be turned on by the leading edge of the squared index signal and turned off by the trailing edge of the squared beam signal, or it may be turned on by the leading edge of the squared beam signal and turned off by the trailing edge of the squared index signal. For purposes of this description, it will be assumed that the second technique is used; that is, that the beam counter is turned on, or enabled, by the leading edge of the beam signal and is turned off, or disabled, by the trailing edge of the index signal. The beam counter provides a beam count output which represents the time during the index period when the beam signal is produced, and this count varies as the level being measured changes to change the time during the rotation of the plane mirror at which the reflected beam strikes the beam detector.

The ratio of the beam count to the index count is then obtained and this value is multiplied by a calibration constant to derive a measure of level.

Since the signal from the beam detector is generally triangular in shape, errors occur in the level measurement when changes in amplitude of the light beam are experienced. In order to avoid the need for complex waveform analysis to correct this difficulty, the present invention takes advantage of the fact that the beam pulse is symmetrical. Because of this symmetry, it becomes possible to determine the center of the beam pulse, and to use that center value as the control for the beam counter. Thus, the basic clock rate which drives the beam counter is divided by two for the duration of the beam pulse. The half count begins when the beam pulse increases above a threshold, and the full clock rate resumes when the beam pulse drops below the threshold. The clock rate continues at its normal level for the remainder of the index time so that the output of the beam counter provides a count which effectively is started at the precise center of the beam pulse and ends at the trailing edge of the index pulse (or which starts at the leading edge of the index pulse and ends at the precise center of the beam pulse). In this manner, variations in the amplitude of the beam detector output are eliminated and an accurate measurement of level can be obtained.

BRIEF DESCRIPTION OF THE DRAWINGS

The foregoing and additional objects, features, and advantages of the present invention will become apparent to those of skill in the art from a consideration of the following detailed description of the invention, taken in conjunction with the accompanying drawings, in which.

DESCRIPTION OF PREFERRED EMBODIMENT

Figure 1:
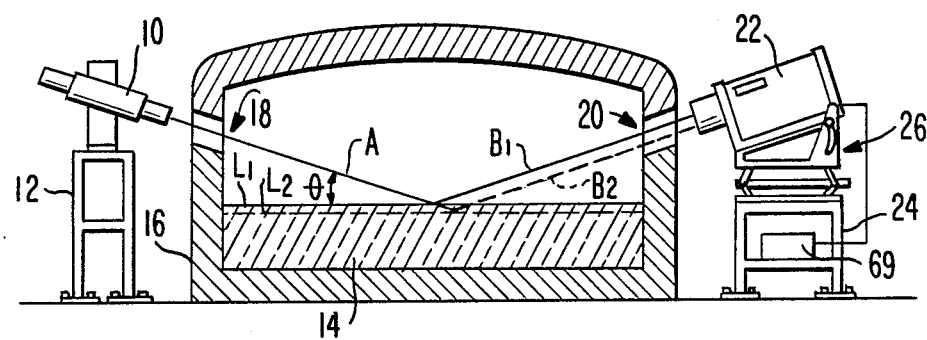
FIG. 1 is a diagrammatic illustration of a typical application of the present invention.

Referring now to the drawings, FIG. 1 illustrates a light source 10, which is preferably a laser, mounted in a suitable housing on a support structure 12 to direct a beam of light along axis A. In the illustrated application, the gauging apparatus is used to monitor the level of a process material 14, such as molten glass within a refractory chamber 16. Axis A passes through opening 18 in a wall of chamber 16 and the beam strikes the surface of material 14 at a predetermined angle. Preferably, the support structure 12 is adjustable to position light source 10 to establish an angle of incidence of the beam upon the material surface at a desired value.

Figure 2:
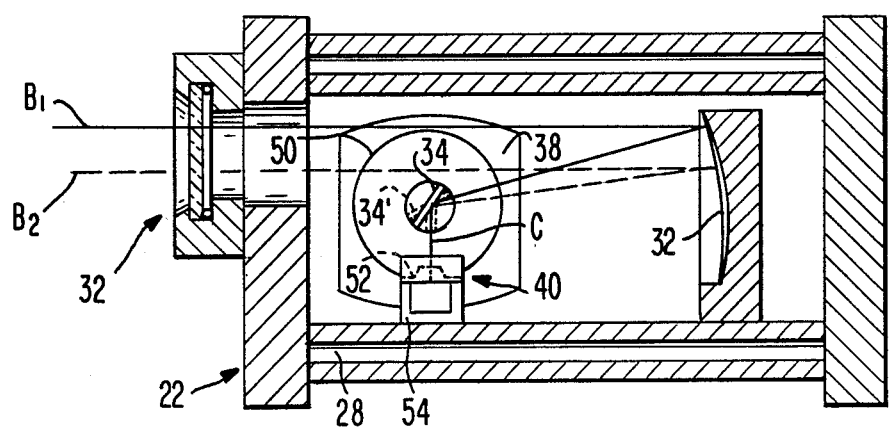
FIG. 2 is a side elevation view, in section, of the detector portion of the apparatus of FIG. 1.

After reflection by the surface of material 14, the beam is directed along a second axis B having a position dependent upon the vertical level of the material surface. When the surface is at the first level, indicated by the solid line $L_1$, the axis of the reflected beam is at $B_1$. When the level is as indicated by the dashed line $L_2$, the reflected beam axis is positioned at $B_2$. The reflected beam passes through opening 20 in a second wall of chamber 16 and is received by a detector unit 22 mounted on support structure 24 and which includes mechanism 26 for adjustable positioning. Detector unit 22 is mounted with its major axis parallel with the axis of the reflected beam B; that is, unit 22 is mounted with its axis at the same angle to the process material surface as the axis of light source 10. Since the system may be employed in applications where very high temperatures are common, water jackets or other cooling means are preferably provided for detector 22 and for light source 10. A passageway for cooling water in the housing of detector 22 is indicated in FIG. 2 at 28. In a preferred form of the invention, the detector and the light source are mounted in cylindrical water jackets which permit easy removal of the detector or the light source for easy service, repair, and replacement.

Figure 3:
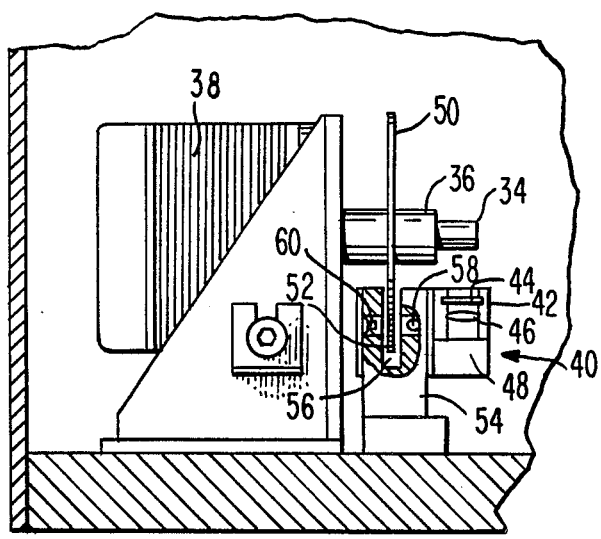
FIG. 3 is a side elevation view of a portion of the apparatus of FIG. 2.

Detector 22 includes an entrance aperture 30 elongated in the direction in which the beam axis is displaced as the level of the process material varies. Within the housing of unit 22, the beam $B_1$ or $B_2$ is directed upon a fixed parabolic mirror 82 and is reflected thereby to plane mirror 34 which is mounted on an output shaft 36 (FIG. 3) of a synchronous electric motor 38. The axis of rotation of motor 38 is in the plane of the reflecting surface of mirror 34 and is at the focal point of mirror 32, so that the beam received by the detector unit 22 is focused by parabolic mirror 82 on the surface of plane mirror 34 at the axis of rotation thereof. The beam, after reflection by mirror 34, is indicated at 0, and is scanned in an arcuate path about the axis of rotation of mirror 34 over that portion of the mirror's travel during each revolution when the beam strikes the mirror's reflective surface.

Positioned at a suitable location in the path of beam C, for example below mirror 34, is a beam detector 40 which includes a housing 42 (FIG. 3) containing a filter 44, a condensing lens 46, and a photodetector 48. At some point in each revolution of mirror 34, the scanned beam will be directed along axis 0 to impinge upon photodetector 48. The angular position of mirror 4 at which this occurs is dependent upon the point at which the incoming beam B strikes mirror 32. For example, when the beam is positioned at axis $B_1$, the reflection of the beam from mirror 84 will be directed along axis C when mirror 84 is at the rotational positioned in FIG. 2. When the beam is positioned at axis $B_2$, the reflection along axis C will occur when mirror 34 is at the rotational position indicated by mirror 34' shown in dotted lines. The positions of mirror 84 shown in FIG. 2 are for comparative purposes only and are not intended to be geometrically accurate.

Output shaft 36 of motor 38 also carries an opaque disc 50 having a cutout area or index opening 52 in a portion thereof. A mounting block 54 below the shaft 36 includes an open slot 56 (FIG. 3) through which the disc travels as it rotates. A light source 58, such as a light emitting diode, and a photodiode 60 are supported in the mounting block 54 on opposite sides of slot 56 at a position which is passed by opening 52 as disc 50 rotates. Thus, opaque disc 50 blocks the passage of light from source 58 to photodiode 60 except at the time opening 52 is positioned between the two. The electrical signal generated by photodiode 60 during the time that the opening 52 is aligned therewith provides a reference or index period in each revolution of motor 38. This motor may operate, for example, at 3600 rpm. The time period which elapses between activation of photodiode 60 as the leading edge of opening 62 passes the light source 58 and activating of photodetector 48, which occurs at a point in the revolution dependent upon the position of the axis of the beam entering the detector unit 22, is thus directly related to the surface level of the process material by which the beam is reflected. The elements are so constructed and arranged that the beam reflected from mirror 34 strikes photodetector 48 during this index period (while opening 52 is positioned between light source 58 and photodiode 60), and the time periods during which this occurs may be measured electronically and converted to a measurement of surface level.

Figure 4:
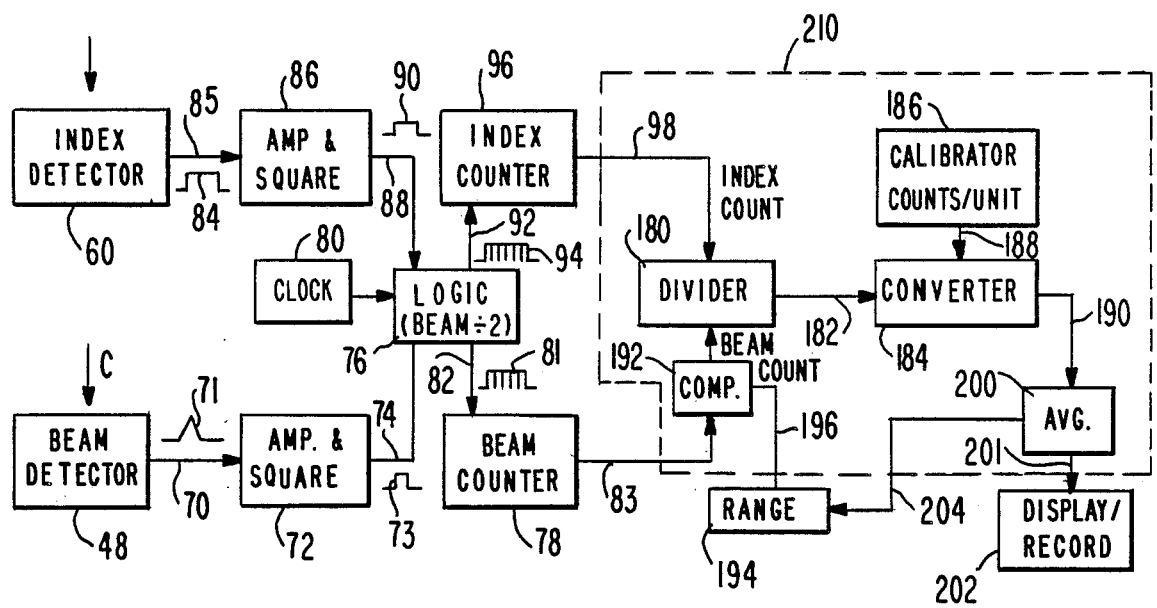
FIG. 4 is a block diagram of the circuit of the present invention.

As illustrated in FIG. 4, the beam detector 48 produces on output line 70 a beam signal 71 which is amplified and squared in amplifier 72 to produce a square wave output pulse 73 which is supplied by way of line 74 to a logic circuit 76 which drives a beam counter 78. The logic circuit is driven by a clock 80, and when enabled by pulse 73 produces a train 81 of output pulses on its output line 82. These plses are counted by beam counter 78 to produce a beam count on line 83.

In similar manner, when the index aperture 52 allows light to reach photodiode 60, the photodiode produces a stepped output signal 84 on line 85 which is supplied to an amplifying and squaring circuit 86 which produces a corresponding square wave output on line 88. This output is the index signal indicated at 90, which signal is supplied by way of line 88 to enable or disable the logic circuit 76 to produce on its output line 92 a train 94 of output index pulses having a duration which corresponds to the length of the index pulse 90. These pules 94 are supplied to, and counted by, an index counter 96 which produces on its output 98 an index count signal.

Beam counts are produced by the counter 78 in either of two ways. The counter can be enabled at the leading edge of the index pulse 90 and disabled at the trailing edge of the beam pulse 73, or in the alternative, the beam counts can be accumulated beginning with the leading edge of the beam pulse 73 and ending with the trailing edge of the index pulse 90. For purposes of illustration, it will be assumed that the second of the two options is utilized; however, similar procedures and techniques for determining the level of the material being measured will be used if the first alternative is selected.

Figure 5:
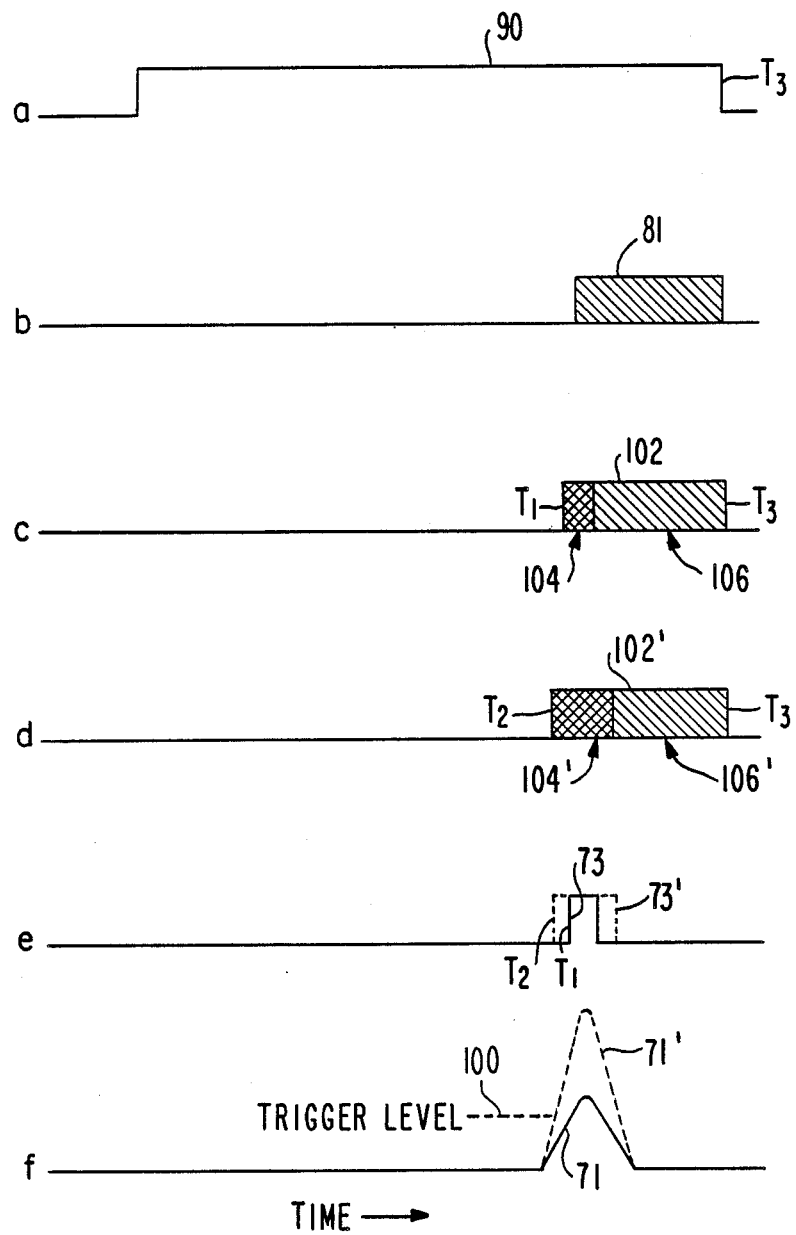
FIG. 5 illustrates the relationship between the beam and index pulses in the circuit of FIG. 4.

As illustrated in FIG. 5a, the index pulse 90 is essentially a square wave pulse which has a duration which is dependent upon the size of the aperture 52 and the rate of rotation of motor 38. The beam counter 78, is enabled (in the illustrated embodiment) by beam pulse 73 by way of logic circuit 76 and is disabled at the end of the index pulse 90. However, it has been found that the signal 71 from the photodetector 48 is in fact somewhat triangular in shape, as illustrated in FIG. 4 and as further illustrated in FIG. 5f, and this triangular shape has been found to produce an error in the beam count, and thus in the level measurements, when changes in the amplitude of the incoming light beam are encountered. Such changes in amplitude are produced, for example, by changes in atmospheric conditions surrounding the material being measured, for when materials such as molten glass are being measured, the presence of combustion gases, water vapor, smoke and dust can significantly, and adversely, affect the amplitude of the light beam reaching the detector unit 22. Thus, under some conditions the incoming beam pulse 71 may have an amplitude such as that indicated by the solid line in FIG. 5f, while under other conditions it may have an amplitude such as that indicated by dotted line 71'.

The amplifier and squaring circuit 72 responds to an input having a minimum threshold signal, indicated by the trigger level 100 in FIG. 5f. Pulses of different amplitudes such as those at 71 and 71' thus reach their trigger level at different times, and accordingly, changes in the amplitude of pulse 71 will result in variations in the width of the squared beam signal 73. For example, the input beam pulse 71 to the squaring circuit 72 would produce the output pulse 73 illustrated in solid lines in FIG. 5e while the input beam pulse 71' would provide the output pulse 73' indicated in dotted lines in FIG. 5e. The variation in width between pulses 73 and 73' would produce a corresponding variation in the starting time of the beam count envelope 102 or 102' as illustrated in FIGS. 5c and 5d at starting times $T_1$ and $T_2$, respectively. Thus, the beam pulse 73 would initiate a count envelope 102 (in FIG. 5c) at the time $T_1$ of the leading edge of pulse 73 and the envelope would terminate at the trailing edge of index pulse 90 at time $T_3$. In similar manner, the beam pulse 73' would start the count envelope 102' at an earlier time $T_2$, with this envelope also terminating at time $T_3$. Such a variation in the beam count envelope would produce different beam counts at the output of counter 78 for the same liquid level; accordingly, these variations would adversely affect the accuracy of measurement of the system of FIG. 4.

To overcome the foregoing difficulties, advantage is taken of the fact that the triangular signal 71 is generally symmetrical so that, in effect, the center of the beam pulse 73 can be used as the starting point for the beam count envelope, making it possible to increase the accuracy of measurement by several orders of magnitude. This is accomplished in logic circuit 76 by dividing the basic clock rate used in counting the duration of beam pulse 102 by two to provide a one-half count to the beam counter 78 only for the duration of the beam pulse 73. The full count is restored for the remainder of beam count envelope; that is, for the envelope 102, a half count is provided for the time period 104 illustrated in FIG. 5c and a full count is provided for the balance of the time period of envelope 102, which is illustrated at 106, and which occurs after the beam pulse 73 ends. It will be noted that the time period 114 is equal to the length of pulse 73.

In similar manner, for a pulse 71' of a differing amplitude, the clock rate for the beam count envelope 102' is divided by two for the time period 104', which is equal to the duration of pulse 73', while the full count is restored for the time period 106' as illustrated in FIG. 5d. The net result is that pulse 90, pulse 73 and pulse 73' produce beam count envelopes 102 and 102', respectively, which provide a half count for the time period of the beam pulse and a full count for the balance of the envelope no matter what the applitude of pulse 71 might be, as long as it exceeds the threshold 100, giving a total full count "equivalent" envelope 81 which contains a series of counts which effectively begins at the center of the beam pulse 71 (or 71'). as illustrated in FIG. 5b and ends at the end of pulse 90. Thus, the equivalent envelope 81 represents a clock pulse count from the precise center of the symmetrical pulse 71 (or 71'), no matter what its amplitude is, and the logic circuit thereby provides an accurate beam count by way of output line 82.

Figure 6:
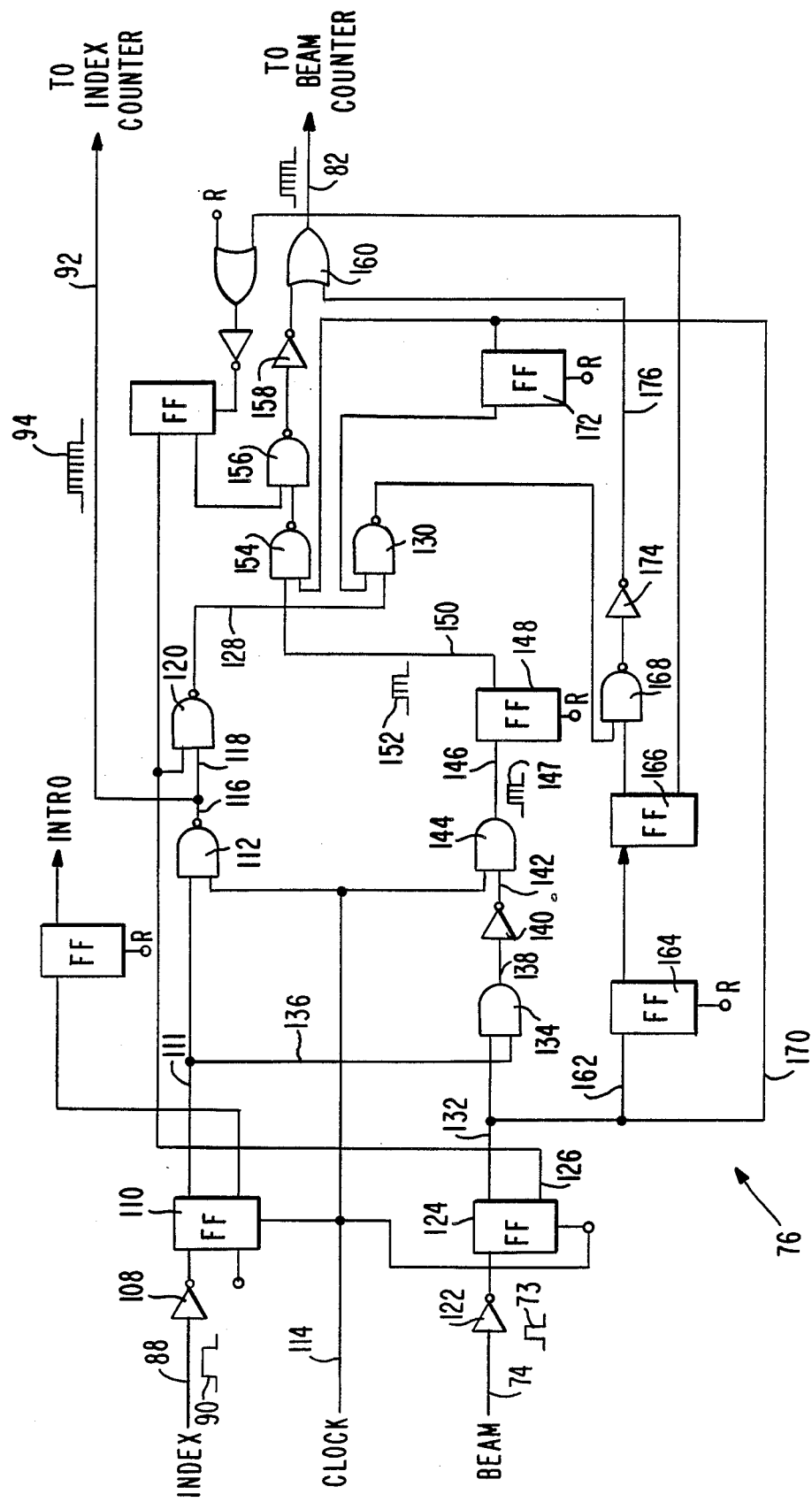
FIG. 6 is a diagram of a logic circuit for the circuitry of FIG. 4.

FIG. 6 illustrates in diagrammatic form a logic circuit suitable for logic element 76 of FIG. 4. This circuit receives the squared beam pulse 73 by way of line 74 and receives the squared index pulse by way of line 88. The index pulse 90 is supplied by way of line 88. The index pulse 90 is supplied by way of an amplifier 108 to a flip flop 110, causing the flip-flop to shift to produce an output on line 111 which enables gate 112 for the duration of the pulse. The system clock 80 is connected by way of line 114 to gate 112 so that the gate 112 produces on its output line 116 a train of pulses 94 at the clock rate for the duration of pulse 90. This train, or pulse envelope, is fed by way of line 92 to the index counter 96, which counts the received pulses to produce the index count on line 98.

The train of pulses 94 is also supplied by way of line 118 to enable a gate 120 for the duration of the index pulse.

The beam pulse 73 is fed by way of line 74 through amplifier 122 to a flip-flop 124. In the absence of a beam pulse, the flip-flop produces an output on line 126 which enables gate 120, so that this gate produces a train of index pulses on its output line 128 to enable gate 130.

In the presence of a beam pulse 73, flip-flop 124 produces an output on line 132 which enables gate 134. This gate is also connected by way of line 136 and line 111 to flip-flop 110, so that gate 134 produces an output on line 138 only when both index pulse 90 and beam pulse 73 are present. The output on line 138 is supplied through amplifier 140 and line 142 to one input of gate 144, the other input of which is connected to the clock so by way of line 114. The output signal on output line 146 of gate 144 thus is a beam pulse train 147 of pulses at the clock rate, the train envelope having a duration equal to that of pulse 73. This train 147 is supplied to the input of a flip-flop 148 which shifts to produce an output on its line 150 for alternate clock pulses supplied to its input 146. Thus, flip-flop 148 divides the pulse rate of the beam pulse train 147 by two, and produces a half-pulse output train 152 on line 150 for the duration of beam pulse 73 which is supplied to gate 154 and passes through gate, amplifier 158 and OR gate 160 to beam output line 82. Thus, during index pulse 73, an output at one-half the clock rate appears on line 82.

During pulse 73, the output of flip-flop 124 is supplied by way of line 182 and line 162 to the input of a flip-flop 164 which, through flip-flop 166 disables a gate 168. The output of flip-flop 124 is also supplied by way of line 170 through flip-flop 172 to disable gate 130 and to gate 154 to enable that gate. This allows gate 154 to transmit beam pulse train 152 to output line 82 during index pulse 73, but at the end of pulse 73, gate 154 is disabled and gate 130 is enabled. Also at the end of pulse 73, flip-flops 164 and 166 shift to enable gate 168, thereby allowing index clock pulses from gate 112 to pass through gates 120, 130, and 168, through amplifier 174 and line 176 to OR gate 160, and thence to output line 82. These pulses continue until index pulse 90 terminates. Thus, the signal on line 82 is a pulse train 81 that is at one-half the clock rate during pulse 73, and after the end of pulse 73 continues at the full clock rate to the end of pulse 90. The total pulse count in the train 81 is the equivalent, therefore, of the full rate count from the midpoint of pulse 73 to the end of pulse 90, as described with respect to FIG. 5.

The pulses contained in pulse train 81 are counted in beam counter 78 to provide an equivalent beam count on line 83 representing the level of the material being measured.

The equivalent beam count is supplied to a divider 180. Also supplied to the divider by way of line 98 is the index count from counter 96 which corresponds to the duration of the index pulse 90. The beam count provided by counter 76 is dependent upon the time during the index pulse 90 at which the beam pulse 71 (or 71') occurs, and thus this count is dependent upon the duration of the equivalent beam count envelope. The divider 180 provides the ratio of the beam count from counter 78 to the index count from counter 96 and this ratio is supplied by way of line 182 to a converter 184 wherein the ratio of beam counts to index counts is divided by a calibration signal representing the number of counts per unit measure. This calibration signal is provided by calibrator 186 to the converter by way of line 188, to produce at the output of converter 184 a signal on line 190 which represents the level being measured in specified units of measure.

A suitable calibration procedure for the detector unit 22 involves positioning the detector unit at a location so that the incoming beam B is midway in its vertical range on the parabolic mirror 32. This is referred as the "zero" level. The beam detector activates counter 78 to produce a beam count which is designated as a "zero" count, and this count is recorded. The detector unit 22 is then moved a known distance in a vertical direction to change the location of the incoming beam B and to thereby change the time of occurrence of pulse 71 with respect to the index pulse 90. Again, the number of counts produced by counter 78 for this beam location is determined, and the difference between this value and the "zero" count provides the number of counts corresponding to the known distance of motion. This difference is then a calibration constant, which is the number of counts per unit of measure and is provided by the calibrator 186 for use in converting the output of divider 180 into a level measurement.

In order further to improve the accuracy of the measurements obtained in accordance with the present invention, a filter may be provided to eliminate invalid beam counts caused by a variety of problems such as transient waves which can occur in the surface being measured. Invalid counts may be those which fall outside a preselected range, and thus are too high or too low for the measurements actually being made. Filtering can be done at the output of the beam counter to eliminate counts which exceed a predetermined number, or can be done after the count has been converted to a level measurement to eliminate results which are outside a selected range. In the embodiment illustrated herein, the filter is connected to the output of the beam counter 78 to eliminate beam counts which lie outside a preselectable range.

The filter includes a comparator 192 connected in line 83 to receive beam count signals and connected to a range circuit 194 by way of line 106. The range circuit establishes minimum and maximum counts for the range of pulse counts which are acceptable, and the comparator passes only those pulse counts which are acceptable.

The range of acceptable pulse counts may be established by a system operator, or if desired, may be based on some specified criteria such as an average value of pulse counts or of the numerical measurement level, for example. In the illustrated embodiment, the range value is based on the average level measurement over a period of time. This is obtained by means of an averaging circuit 200, for example, connected by way of line 190 to the output of converter 182. The averaging circuit 200 samples each level measurement from converter 184 over a period of time, determines an average value, and supplies that value by way of line 201 to a display/record device 202 and, by way of line 204, to the range circuit 194. The value established in the range circuit limits the minimum and/or maximum number of beam counts which can be supplied to the divider 180.

Figure 7:
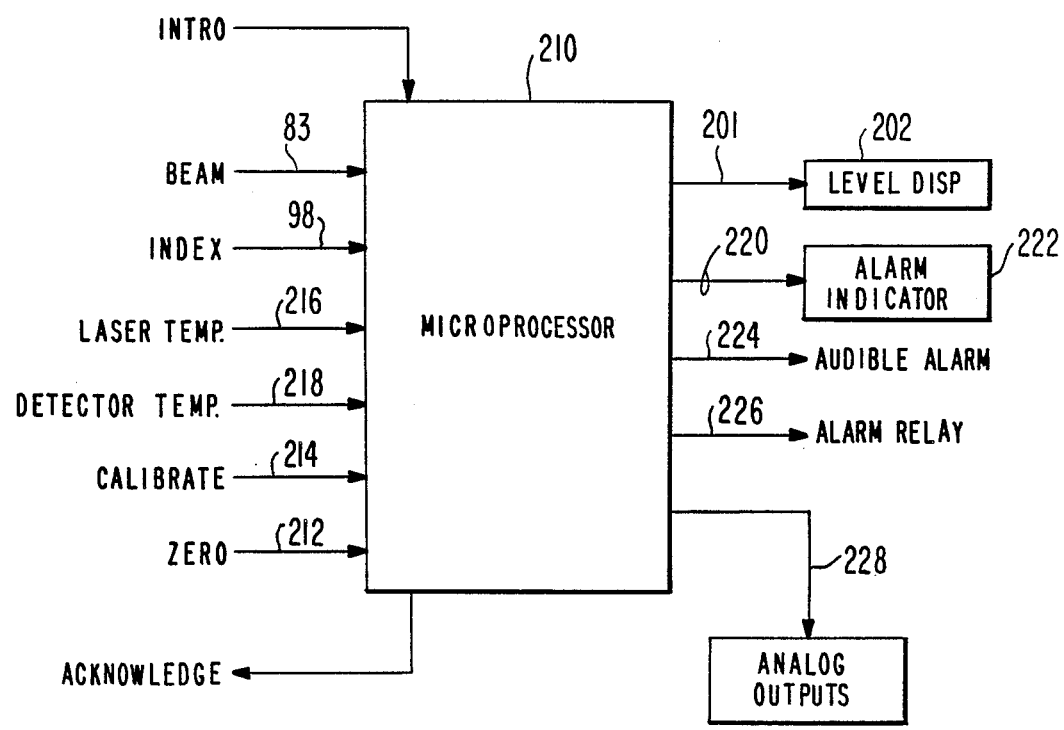
FIG. 7 is a diagrammatic illustration of the measurements and outputs utilized in the system of the present invention.

Obtaining the ratio and converting it into a measurement value preferably is carried out by means of a suitable microprocessor or computer indicated in FIG. 4 at 210 in FIGS. 4 and 7. It will be understood that the computer 210 receives the beam counts on line 83, the index counts on line 98, the zero count information on line 212 and the calibrating count on line 214, all as illustrated in FIG. 7, and from these inputs provides the necessary calculations to produce the desired ratios and conversions so as to produce on display 202 the level of the material being measured. In addition, the computer 210 receives inputs related to the temperature of the laser source 10 by way of line 216 and the temperature of the detector unit 22 by way of line 218 so as to provide alarm signals on cable 220 if these values exceed the ranges in which the system can properly operate. Thus, for example, the computer 210 produces alarm output signals on cable 220 in response to a high detector temperature, a low detector temperature, a high laser temperature or a low laser temperature, and produces alarm indications at an indicator 222 in response to these signals. Alarm signals can also be provided on cable 220 for an excessively high or an excessively low level of the material being measured, and can also provide warnings of a loss of the laser beam or a loss of the index signal. In addition to LED alarm indicators, audible alarms can also be provided by way of alarm signals on lines 224 and 226. Finally, in addition to the level display 202, an analog output corresponding to the measured value can also be provided on output line 228, if desired.

Although the present invention has been described in terms of a preferred embodiment, it will be understood that numerous modifications and variations may be made without departing from the true spirit and scope thereof as set forth in the following claims.

What is claimed is:

1. An optical measuring system for measuring the surface level of a light-reflective material, comprising:
   a detector unit including a fixed, parabolic mirror, and a rotatably mounted plane mirror having its axis of rotation at the focal point of said parabolic mirror, whereby a beam of light directed to the plane mirror from said parabolic mirror will be reflected in a circular path about said axis of rotation;
   a source of light directing a beam of light along a predetermined path which includes the reflective surface of said light reflective material, said parabolic mirror, and said plane mirror;
   index means responsive to the rotation of said plane mirror to produce an index signal for each revolution of said plane mirror;
   a light-responsive detector lying in said circular path and responsive to said beam of light on said predetermined path for generating a beam signal during said index signal, said parabolic and plane mirrors being so related that variations in the surface level of said light-reflective material produces a corresponding variation in the time of occurrence of said beam signal with respect to said index signal;
   clock means having a fixed clock rate;
   logic circuit means driven by said clock means and responsive to said index signal to produce a train of index count pulses having a count corresponding to the duration of said index signal and responsive to said beam signal to produce a train of beam count pulses having a count corresponding to the time of occurrence of said beam pulse signal with respect to said index signal;
   means determining the ratio of said beam count pulses to said index count pulses; and
   means responsive to said ratio for providing an indication of the level of the surface of said light-reflective material.

2. The system of claim 1, wherein said logic circuit means producing said train of beam count pulses is enabled by the leading edge of said beam signal and is disabled by the trailing edge of said index signal.

3. The system of claim 1, wherein said logic circuit means includes divider means enabled by and operable for the duration of said beam pulse to reduce the clock rate of at least a portion of said train of beam count pulses, whereby the count in said train of beam count pulses corresponds to the time of occurrence of the center of said beam pulse with respect to said index signal.

4. The system of claim 3, further including:
   beam counter means connected to said logic circuit and responsive to said train of beam count pulses to produce a beam count; and
   index counter means connected to said logic circuit and responsive to said train of index count pulses to produce an index count;
   and wherein said ratio determining means is connected to said beam counter and said index counter.

5. The system of claim 4, further including filter means for said beam count for rejecting beam counts which deviate by a predetermined amount from an average value.

6. The system of claim 5, wherein said means responsive to said ratio includes calibrator mean for converting said ratio to a unit measure.

7. The system of claim 4, wherein said logic circuit means includes first gate means enabled by said index signal to produce a train of index count pulses at the clock rate of said clock means, and includes second gate means responsive to said beam pulse signal to produce a train of beam pulses at the clock rate of said clock means, and wherein said divider means divides the count of said beam pulses by two to produce a first portion of said train of beam count pulses.

8. The system of claim 7, wherein said logic circuit includes third gate means responsive to said index signal and to said beam signal for producing a second portion of said train of beam count pulses at said clock rate.

* * * * *